(12) United States Patent
Nose et al.

(10) Patent No.: US 7,139,129 B2
(45) Date of Patent: Nov. 21, 2006

(54) IMAGE-TAKING APPARATUS

(75) Inventors: Hiromichi Nose, Sakai (JP); Mamoru Terada, Sakai (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 10/876,362

(22) Filed: Jun. 24, 2004

(65) Prior Publication Data
US 2005/0200970 A1    Sep. 15, 2005

(30) Foreign Application Priority Data
Mar. 11, 2004    (JP) .............................. 2004-069416

(51) Int. Cl.
G02B 15/14    (2006.01)
H04N 5/262    (2006.01)

(52) U.S. Cl. ..................... 359/682; 359/680; 348/240.3

(58) Field of Classification Search ............. 348/240.3; 359/680, 682, 689
See application file for complete search history.

(56) References Cited

U.S. PATENT DOCUMENTS

| | | | |
|---|---|---|---|
| 5,357,374 A | 10/1994 | Ohno | 359/689 |
| 5,745,301 A | 4/1998 | Betensky et al. | 359/689 |
| 6,040,949 A | 3/2000 | Ohno | 359/689 |
| 6,229,655 B1 | 5/2001 | Kohno et al. | 359/689 |
| 6,532,114 B1 | 3/2003 | Kohno et al. | 359/689 |
| 6,781,770 B1* | 8/2004 | Chang et al. | 359/689 |
| 6,804,064 B1* | 10/2004 | Hirakawa | 359/682 |
| 6,917,476 B1* | 7/2005 | Eguchi | 359/689 |

FOREIGN PATENT DOCUMENTS

| JP | 2002-72095 A | 3/2002 |
|---|---|---|
| JP | 2003-177314 A | 6/2003 |

* cited by examiner

Primary Examiner—David N. Spector
(74) Attorney, Agent, or Firm—Sidley Austin LLP

(57) ABSTRACT

A zoom lens system for forming an optical image of a subject on the image-sensing surface of an image sensor includes at least, from the object side thereof, a first lens unit having a negative optical power and a second lens unit having a positive optical power, and achieves zooming by varying the distances between the individual lens units in such a way that, during zooming from the wide-angle end to the telephoto end, the distance between the first and second lens units decreases. The first lens unit consists of two plastic lens elements.

20 Claims, 9 Drawing Sheets

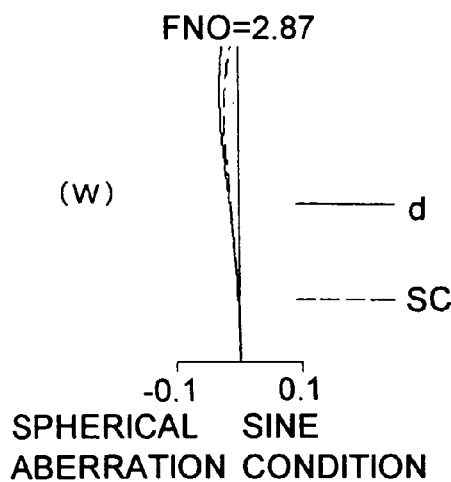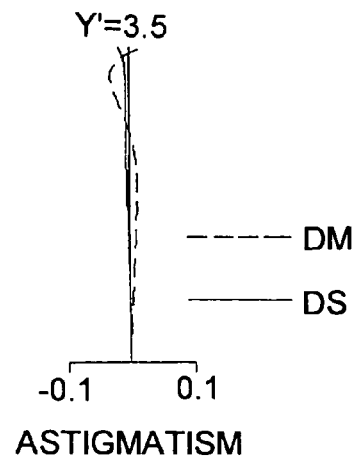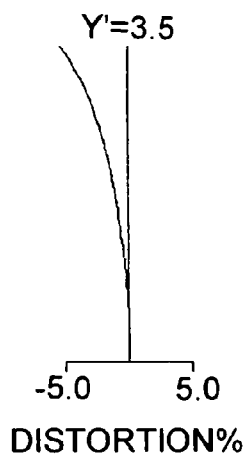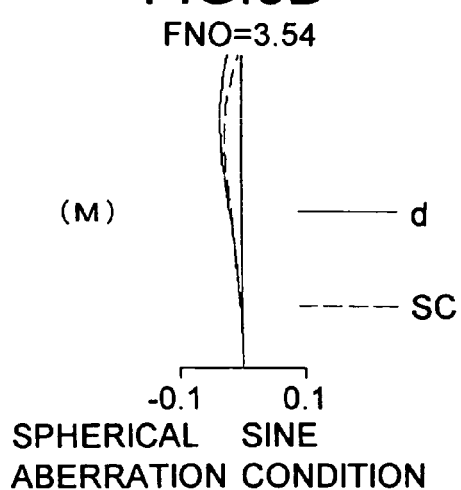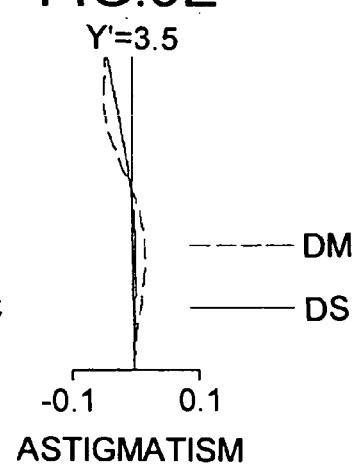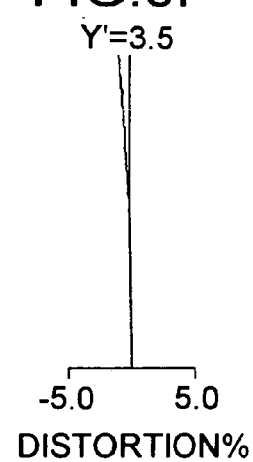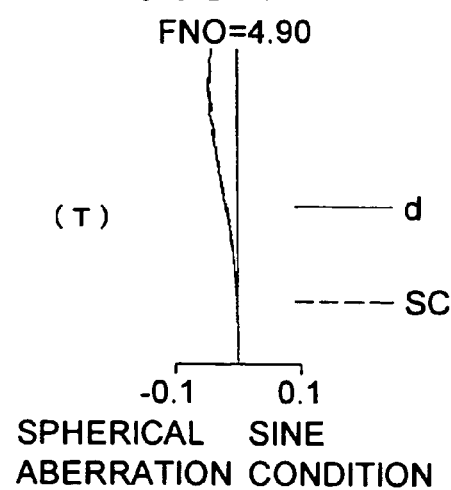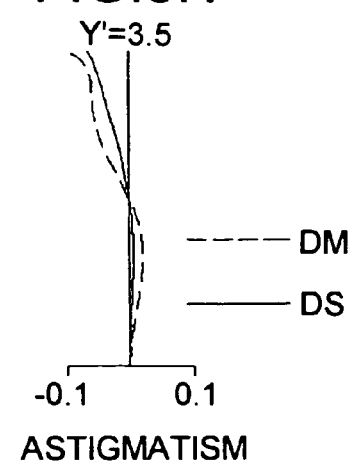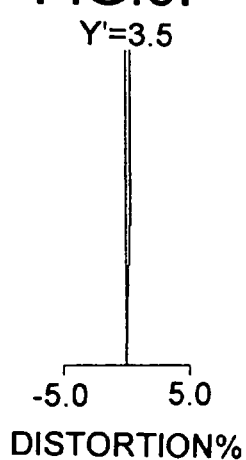

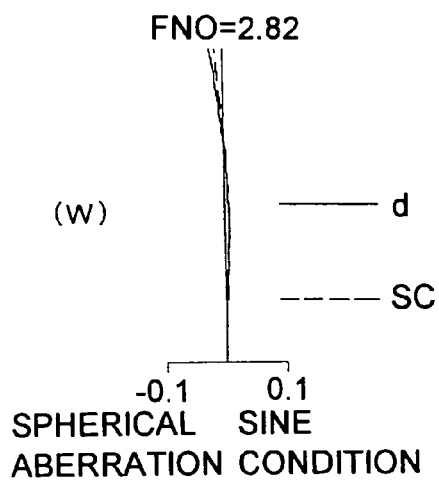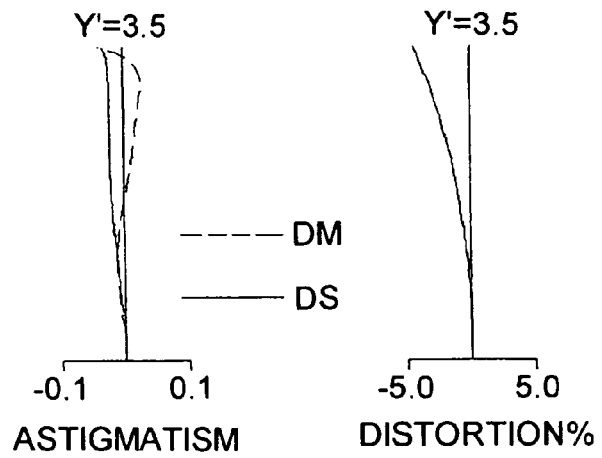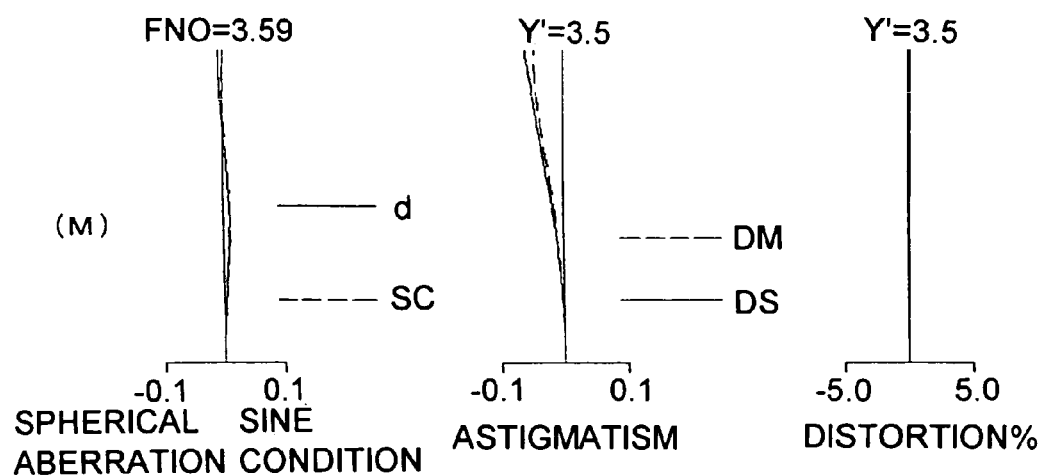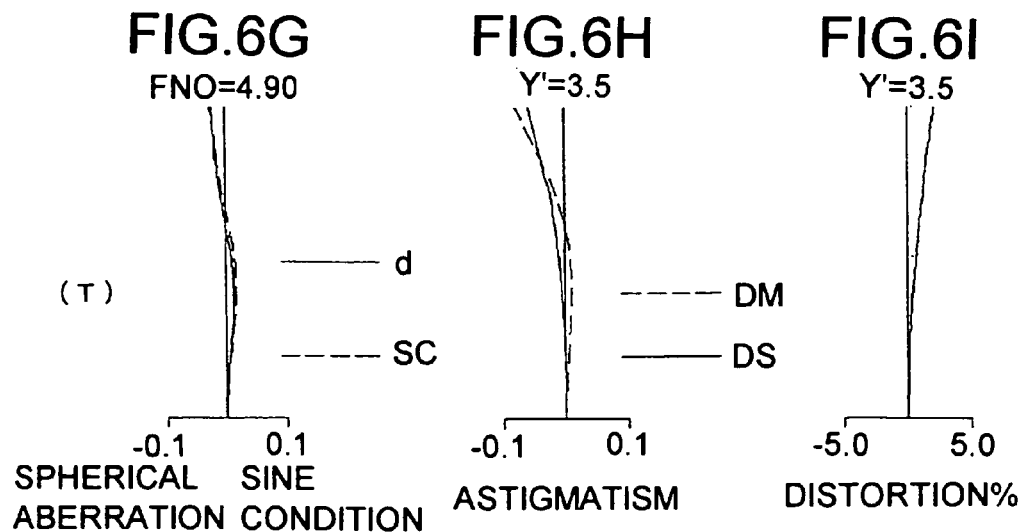

FNO=2.81
(W)
— d
--- SC
-0.1    0.1
SPHERICAL SINE
ABERRATION CONDITION

Y'=3.5
--- DM
— DS
-0.1    0.1
ASTIGMATISM

Y'=3.5
-5.0    5.0
DISTORTION%

FNO=3.69
(M)
— d
--- SC
-0.1    0.1
SPHERICAL SINE
ABERRATION CONDITION

Y'=3.5
--- DM
— DS
-0.1    0.1
ASTIGMATISM

Y'=3.5
-5.0    5.0
DISTORTION%

FNO=4.90
(T)
— d
--- SC
-0.1    0.1
SPHERICAL SINE
ABERRATION CONDITION

Y'=3.5
--- DM
— DS
-0.1    0.1
ASTIGMATISM

Y'=3.5
-5.0    5.0
DISTORTION%

FNO=2.77
(W)
— d
---- SC
SPHERICAL SINE
ABERRATION CONDITION

Y'=3.5
---- DM
— DS
ASTIGMATISM

Y'=3.5
DISTORTION%

FNO=3.71
(M)
— d
---- SC
SPHERICAL SINE
ABERRATION CONDITION

Y'=3.5
---- DM
— DS
ASTIGMATISM

Y'=3.5
DISTORTION%

FNO=4.90
(T)
— d
---- SC
SPHERICAL SINE
ABERRATION CONDITION

Y'=3.5
---- DM
— DS
ASTIGMATISM

Y'=3.5
DISTORTION%

IMAGE-TAKING APPARATUS

This application is based on Japanese Patent Application No. 2004-069416 filed on Mar. 11, 2004, the contents of which are hereby incorporated by reference.

BACKGROUND OF THE INVENTION

1. Field of the Invention

The present invention relates to an image-taking apparatus, and more particularly to an image-taking apparatus that takes in an image of a subject optically through a zoom lens system and then outputs it in the form of an electrical signal by means of an image sensor, and among others to an image-taking apparatus provided with a compact, light-weight zoom lens system.

2. Description of the Prior Art

Today, digital cameras are quite popular. Digital cameras dispense with silver-halide film, and use instead an image sensor such as a CCD (charge-coupled device) or CMOS (complementary metal oxide semiconductor) sensor to convert an optical image into an electrical signal so that the optical image can be recorded and transferred in the form of digital data. A digital camera incorporates an image-taking apparatus provided with a lens system and an image sensor, and, in recent years, such image sensors have come to have increasingly large numbers of pixels. Correspondingly, the demand for high-performance image-taking apparatuses has been increasing greatly. Among others, compact image-taking apparatuses have been eagerly sought after that incorporate a zoom lens system that permits zooming without degrading image quality. In addition, in recent years, as the image processing performance of semiconductor devices and the like increases, more and more personal computers, mobile computers, cellular phones, personal digital assistants (PDAs), and the like have come to be internally or externally fitted with an image-taking apparatus having a zooming capability. This has been spurring on the demand for compact, high-performance image-taking apparatuses.

To make an image-taking apparatus compact, the zoom lens system incorporated therein needs to be made compact. Thus, many zoom lens systems have been proposed that aim at compactness. For example, zoom constructions including, from the object side, at least a first lens unit having a negative optical power and a second lens unit having a positive optical power (so-called "negative-led" zoom lens systems) are proposed in the following patent publications:

Publication 1: U.S. Pat. No. 5,357,374
Publication 2: U.S. Pat. No. 5,745,301
Publication 3: U.S. Pat. No. 6,040,949
Publication 4: U.S. Pat. No. 6,229,655
Publication 5: U.S. Pat. No. 6,532,114
Publication 6: Japanese Patent Application Laid-Open No. 2002-72095
Publication 7: Japanese Patent Application Laid-Open No. 2003-177314

Patent publications 1 to 7 all disclose zoom lens systems that employ a plastic lens element as the lens element disposed at the object-side end thereof. Using a plastic lens element makes it easy to introduce an aspherical surface, and helps reduce costs. However, with the constructions disclosed in patent publications 1 to 7, it is difficult to achieve compactness while maintaining high optical performance. For example, in the zoom lens systems disclosed in patent publications 1 and 2, the first lens unit is composed solely of a single lens element and is kept in a fixed position during zooming. This results in insufficient correction of aberrations. Also in the zoom lens systems disclosed in patent publications 3 and 7, the first lens unit is composed solely of a single lens element, resulting in insufficient correction of aberrations. Of the constructions disclosed in Publications 4 and 5, those in which the first lens unit is composed of three lens elements do not achieve satisfactory compactness, and even those in which the first lens unit is composed of two lens elements includes only one plastic lens element and thus produce unsatisfactorily corrected aberrations. Moreover, none of these constructions contributes to satisfactory cost reduction. Of the constructions disclosed in Publication 6, those in which the first lens unit is composed of one lens element produce unsatisfactorily corrected aberrations, and even those in which the first lens unit is composed of two lens elements includes only one plastic lens element and thus produce unsatisfactorily corrected aberrations. Moreover, none of these constructions contributes to satisfactory cost reduction.

SUMMARY OF THE INVENTION

An object of the present invention is to provide an image-taking apparatus incorporating a zoom lens system that offers high optical performance despite being compact.

To achieve the above object, according to one aspect of the present invention, in a zoom lens system for forming an optical image of a subject on the image-sensing surface of an image sensor, the zoom lens system includes at least, from the object side thereof, a first lens unit having a negative optical power and a second lens unit having a positive optical power, and achieves zooming by varying the distances between the individual lens units in such a way that, during zooming from the wide-angle end to the telephoto end, the distance between the first and second lens units decreases. Moreover, the first lens unit consists of two plastic lens elements.

According to another aspect of the present invention, in an image-taking apparatus provided with a zoom lens system that is composed of a plurality of lens units and that achieves zooming by varying the distances between the lens units and an image sensor that converts the optical image formed by the zoom lens system into an electrical signal, the zoom lens system is constructed as described in the preceding paragraph.

According to still another aspect of the present invention, in a camera provided with an image-taking apparatus that takes in an image of a subject optically and then outputs it in the form of an electrical signal, the image-taking apparatus is constructed as described in the preceding paragraph.

BRIEF DESCRIPTION OF THE DRAWINGS

This and other objects and features of the present invention will become clear from the following description, taken in conjunction with the preferred embodiments with reference to the accompanying drawings in which:

FIGS. 5A to 5I are aberration diagrams of Example 1;
FIGS. 6A to 6I are aberration diagrams of Example 2.

DESCRIPTION OF THE PREFERRED EMBODIMENTS

Hereinafter, image-taking apparatuses and the like embodying the present invention will be described with reference to the drawings. An image-taking apparatus according to the invention is an optical apparatus that optically takes in an image of a subject and then outputs it in the form of an electrical signal. Such an image-taking apparatus is used as a main component of a camera that is used to shoot a still or moving picture of a subject. Examples of such cameras include digital cameras, video cameras, surveillance cameras, car-mounted cameras, cameras for videophones, cameras for intercoms, and cameras incorporated in or externally fitted to personal computers, mobile computers, cellular phones, personal digital assistants (PDAs), peripheral devices therefor (such as mouses, scanners, and printers), and other digital devices. As these examples show, by the use of an image-taking apparatus, it is possible not only to build a camera but also to incorporate an image-taking apparatus in various devices to provide them with a camera capability. For example, it is possible to realize a digital device provided with an image input capability, such as a cellular phone furnished with a camera.

Incidentally, the term "digital camera" in its conventional sense denotes one that exclusively records optical still pictures, but, now that digital still cameras and home-use digital movie cameras that can handle both still and moving pictures have been proposed, the term has come to be used to denote either type. Accordingly, in the present specification, the term "digital camera" denotes any camera that includes as its main component an image-taking apparatus provided with an image-taking lens system for forming an optical image, an image sensor for converting the optical image into an electrical signal, and other components, examples of such cameras including digital still cameras, digital movie cameras, and Web cameras (i.e., cameras that are connected, either publicly or privately, to a device connected to a network to permit exchange of images, including both those connected directly to a network and those connected to a network by way of a device, such as a personal computer, having an information processing capability).

Figure 1:
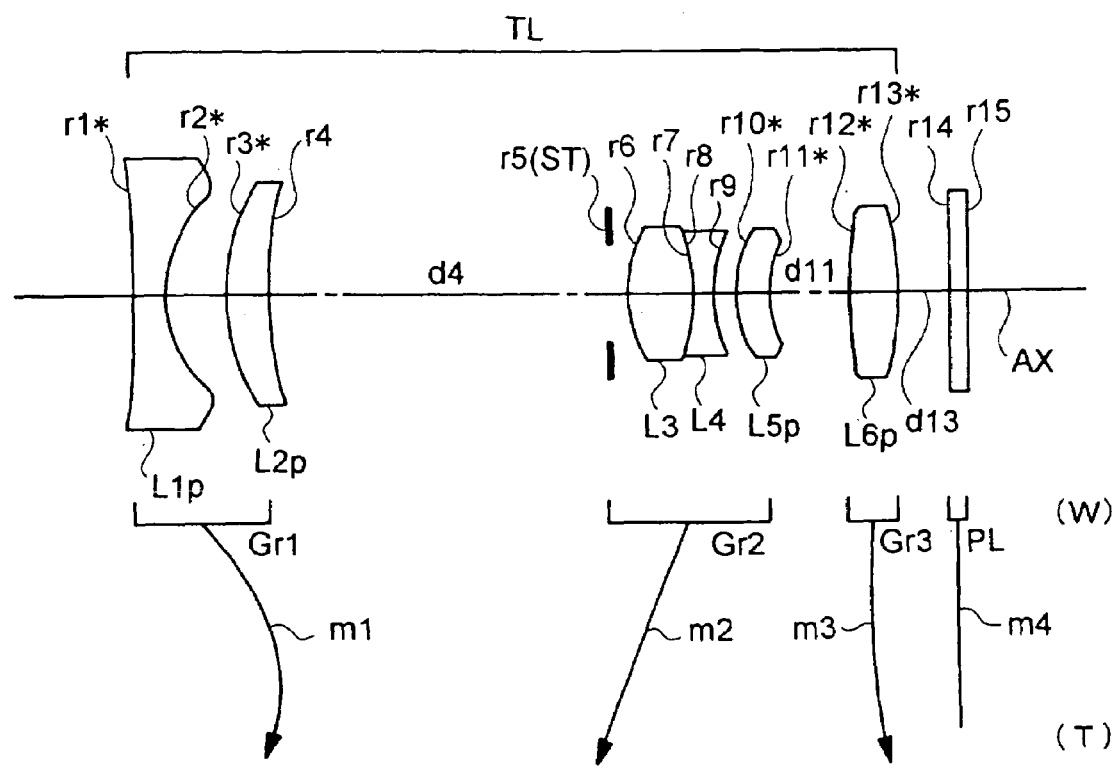
FIG. 1 is a lens construction diagram of a first embodiment (Example 1) of the invention.
Figure 2:
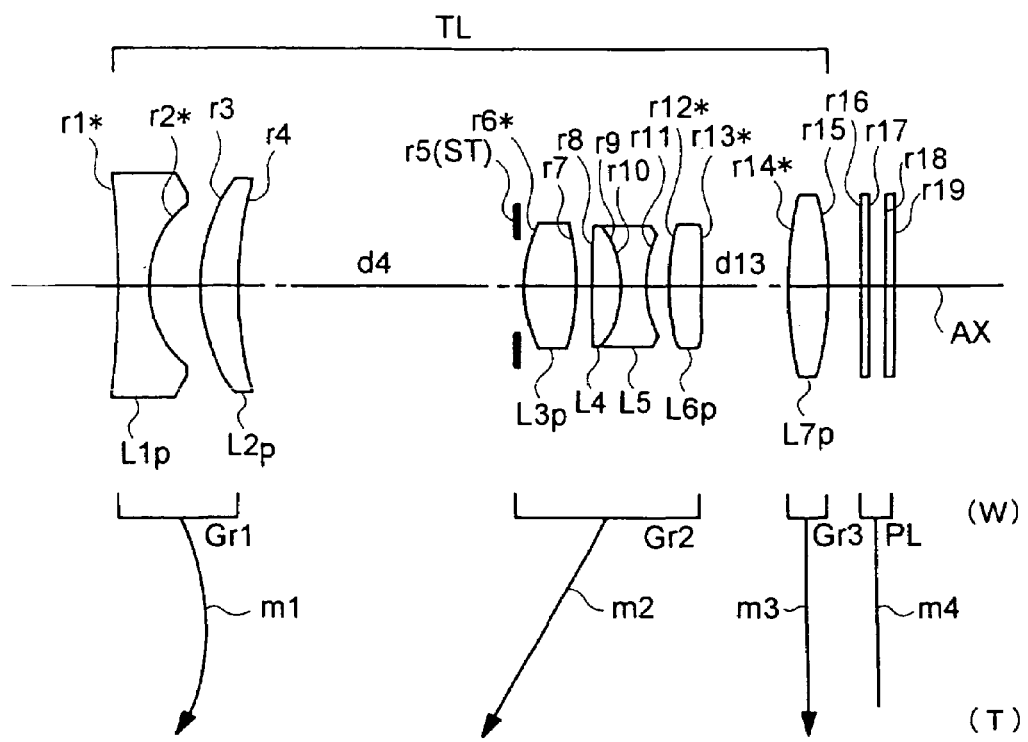
FIG. 2 is a lens construction diagram of a second embodiment (Example 2) of the invention.
Figure 3:
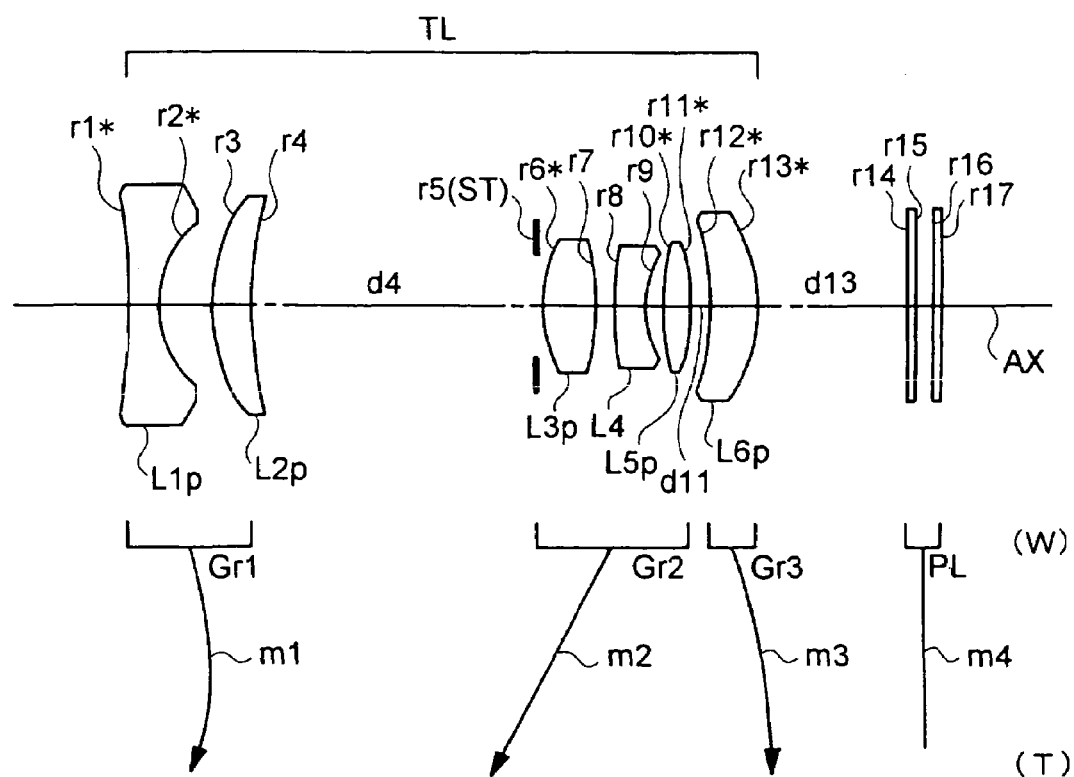
FIG. 3 is a lens construction diagram of a third embodiment (Example 3) of the invention.
Figure 4:
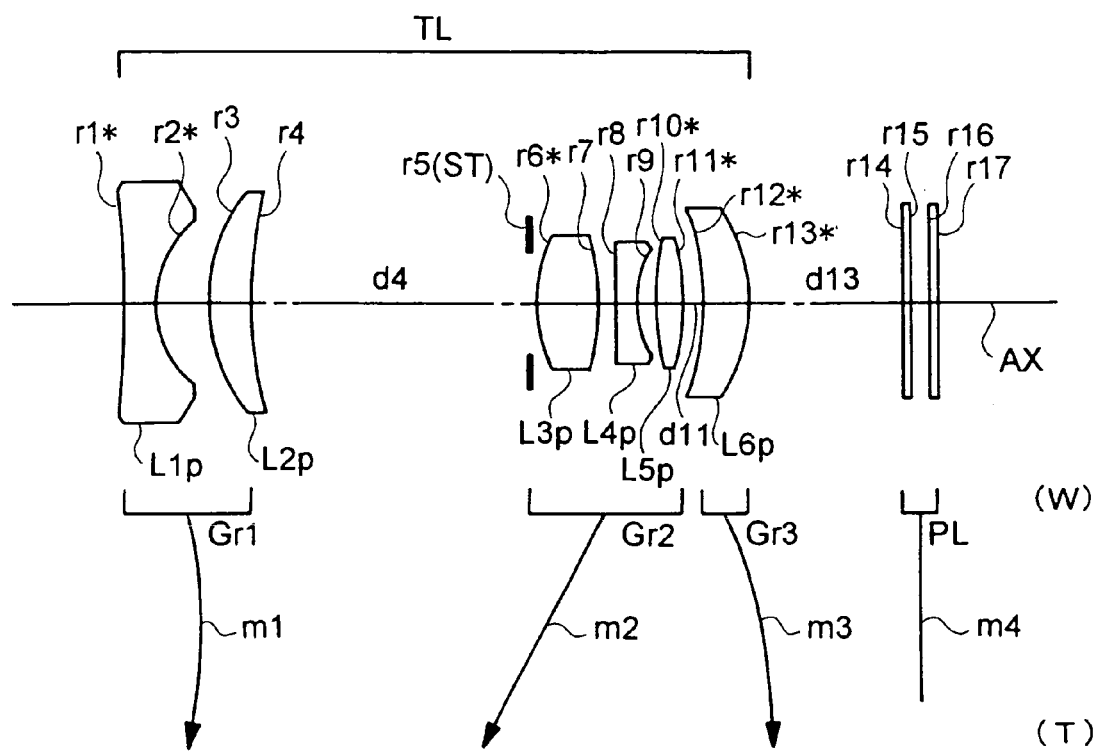
FIG. 4 is a lens construction diagram of a fourth embodiment (Example 4) of the invention.
Figure 7A:
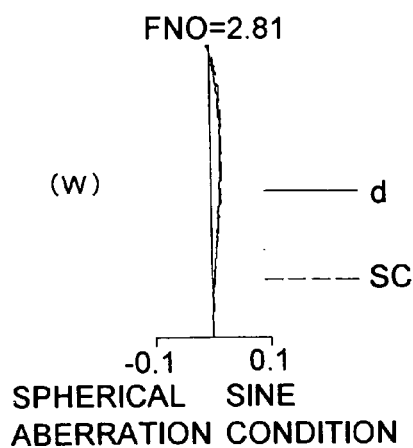
FIGS. 7A to 7I are aberration diagrams of Example 3.
Figure 7B:
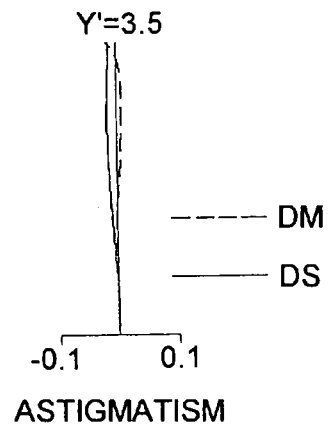
Figure 7C:
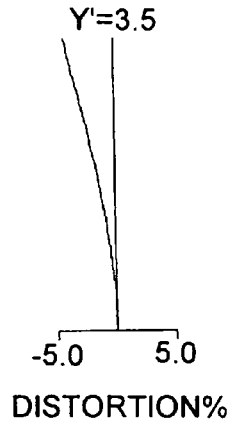
Figure 7D:
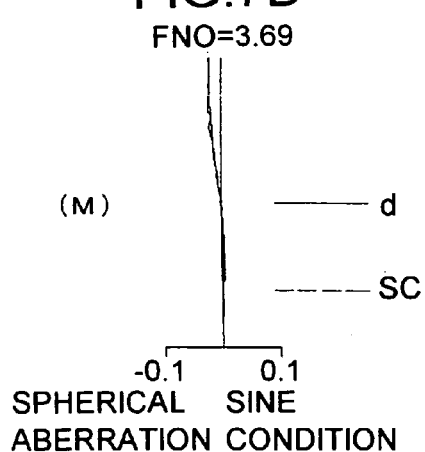
Figure 7E:
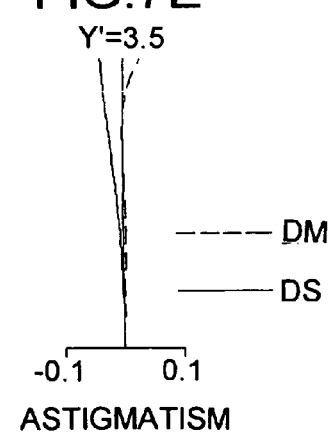
Figure 7F:
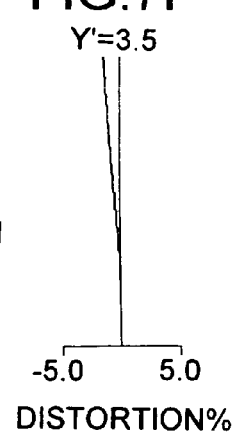
Figure 7G:
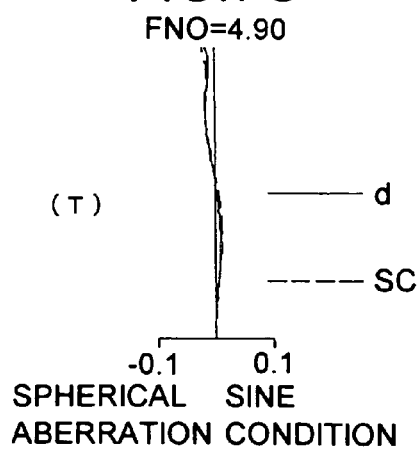
Figure 7H:
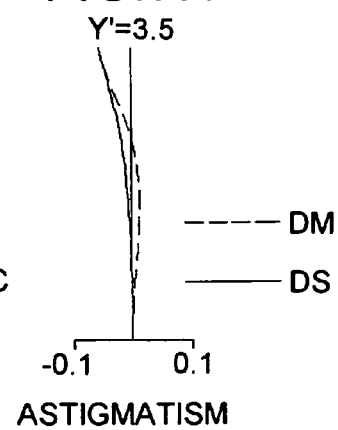
Figure 7I:
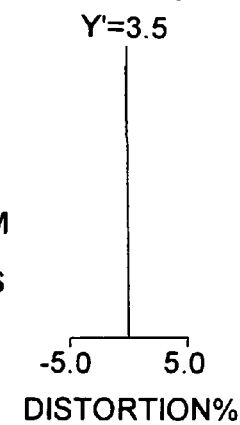
Figure 8A:
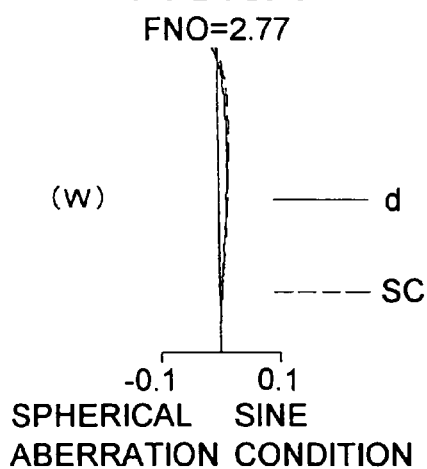
FIGS. 8A to 8I are aberration diagrams of Example 4.
Figure 8B:
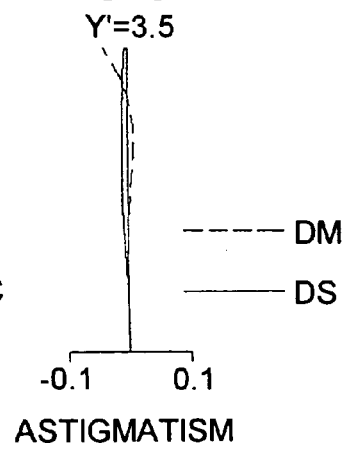
Figure 8C:
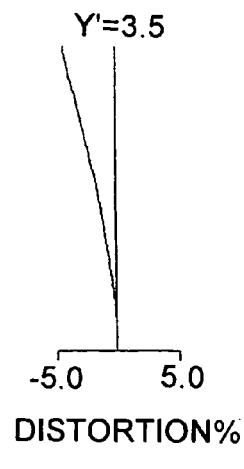
Figure 8D:
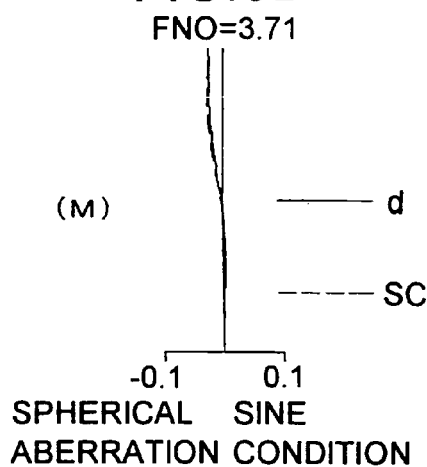
Figure 8E:
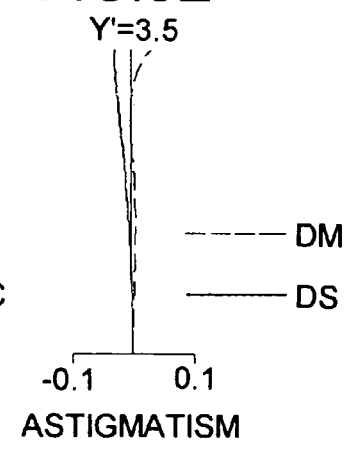
Figure 8F:
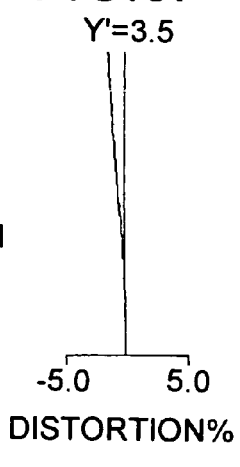
Figure 8G:
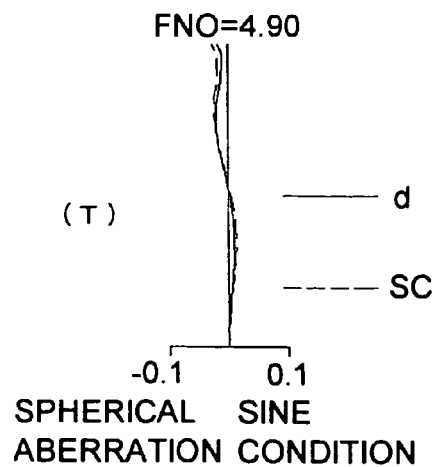
Figure 8H:
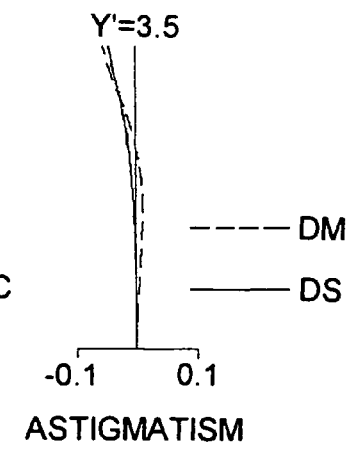
Figure 8I:
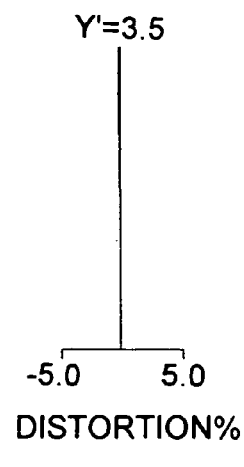
Figure 9:
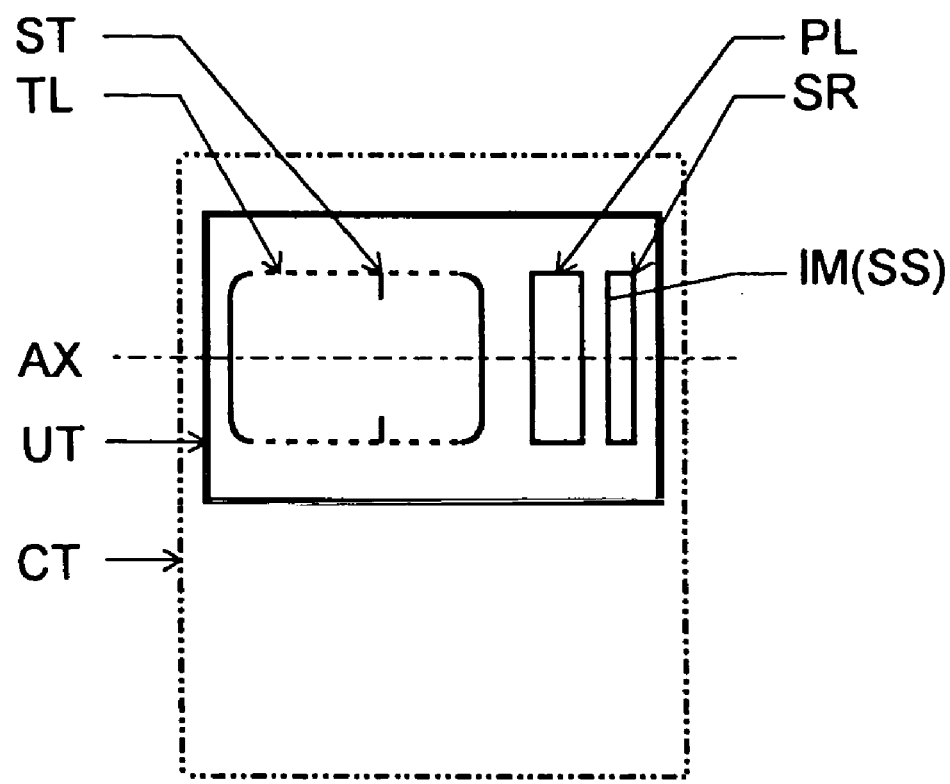
FIG. 9 is a diagram schematically showing an outline of the optical construction of an image-taking apparatus according to the invention.

FIG. 9 shows an example of the construction of an image-taking apparatus UT. This image-taking apparatus UT is composed of, from the object (i.e., subject) side thereof, a zoom lens system TL (corresponding to an image-taking lens system) for forming an optical image (image plane IM) of an object at a variable magnification, a parallel-plane plate PL (corresponding to an optical filter such as an optical low-pass filter or infrared cut filter arranged as required, and to the cover glass of an image sensor SR), and an image sensor SR for converting the optical image IM formed on the light-receiving surface SS thereof by the zoom lens system TL into an electrical signal. The image-taking apparatus UT is used as a component of a digital device CT corresponding to a digital camera, portable data device (i.e., a compact and portable data equipment terminal such as a cellular phone or PDA), or the like. When this image-taking apparatus UT is incorporated in a digital camera, the image-taking apparatus UT is usually arranged inside the body of the camera. Here, the camera capability can be realized in a desired manner that suits particular needs. For example, the image-taking apparatus UT may be built as a unit that is freely detachable from or freely rotatable relative to the body of the camera; or the image-taking apparatus UT may be built as a unit that is freely detachable from or freely rotatable relative to a portable data device (such as a cellular phone or PDA).

The zoom lens system TL is composed of a plurality of lens units, and is so constructed as to vary the magnification (i.e., achieve zooming) by moving those lens units along the optical axis AX in such a way as to vary the distances between them. In all the embodiments described later, the zoom lens system TL has a three-unit zoom construction composed of a negative, a positive, and a positive optical power. Used as the image sensor SR is, for example, a solid-state image sensor such as a CCD (charge-coupled device) or CMOS (complementary metal oxide semiconductor) sensor having a plurality of pixels. The optical image formed by the zoom lens system TL (on the light-receiving surface SS of the image sensor SR) is converted into an electrical signal by the image sensor SR. The signal produced by the image sensor SR is subjected to predetermined digital image processing, image compression processing, and the like as required, and is recorded in a memory (such as a semiconductor memory or an optical disk) as a digital video signal; in some cases, the signal is transferred to another device through a cable or after being converted into an infrared signal.

In the image-taking apparatus UT shown in FIG. 9, the zoom lens system TL performs reduction-projection from the subject located on the enlargement side to the image sensor SR located on the reduction side. It is, however, also possible to use instead of the image sensor SR a display device (for example, a liquid crystal display device) that displays a two-dimensional image, and use the zoom lens system TL as a projection lens system. In this way, it is possible to realize an image projection apparatus that performs enlargement-projection from the image display surface located on the reduction side to a screen surface located on the enlargement side. That is, the zoom lens systems TL of all the embodiments described below can be suitably used not only as an image-taking lens system but also as a projection lens system.

FIGS. 1 to 4 are lens construction diagrams corresponding to the zoom lens systems TL used in a first to a fourth embodiment, respectively, of the invention, each showing the lens construction as observed at the wide-angle end W in an optical section. In each lens construction diagram, a surface marked as ri (i=1, 2, 3, . . . ) is the i-th surface from the object side (with an asterisk (*) following ri indicating an aspherical surface), and an axial distance marked as di (i=1, 2, 3, . . . ) is the i-th axial distance from the object side, though only those axial distances which vary as zooming is performed, i.e., variable axial distances, are shown here. A lens element marked as Lj (j=1, 2, 3, . . . ) is the j-th lens element from the object side, with a letter "p" following Lj indicating a plastic lens element. Moreover, in each lens construction diagram, arrows m1, m2, and m3 schematically indicate the movement of the first, second, and third lens units Gr1, Gr2, and Gr3, respectively, during zooming from the wide-angle end W to the telephoto end T, and a straight line m4 indicates that the parallel-plane plate PL is kept in a fixed position during zooming. In all the embodiments, during zooming, the first lens unit Gr1 moves first toward the image side and then slightly back toward the object side as if to make a U-turn, and the second lens unit Gr2 moves straight toward the object side. During zooming, the third lens unit Gr3 remains in a fixed position in the second embodiment, and moves toward the image side in the first, third, and fourth embodiments.

In all of the first to fourth embodiments, the zoom lens system TL is constructed as a three-unit zoom lens system that is composed of, from the object side thereof, a first lens unit GR1 having a negative optical power (an optical power is a quantity defined as the reciprocal of a focal length), a second lens unit GR2 having a positive optical power, and a third lens unit GR3 having a positive optical power and that achieves zooming by moving at least the first and second lens units GR1 and GR2 in such a way as to vary the distances between the individual lens units. During zooming from the wide-angle end W to the telephoto end T, the second lens unit Gr2 moves toward the object side so that the distance between the first and second lens units Gr1 and Gr2 decreases. That is, zooming is achieved as a result of the second lens unit Gr2 moving toward the object side so as to function as a variator, and the resulting deviation of the focal point is corrected by the movement of the first lens unit Gr1. Now, the lens construction of each embodiment will be described in more detail.

In the first embodiment (FIG. 1), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side and having an aspherical surface on the object side. The second lens unit Gr2 is composed of, from the object side, an aperture stop ST, a cemented lens element formed by cementing together a third lens element L3 and a fourth lens element L4, and a fifth lens element L5. The third lens element L3 is a biconvex positive glass lens element. The fourth lens element L4 is a biconcave negative glass lens element. The fifth lens element L5 is a positive meniscus plastic lens element convex to the object side and having aspherical surfaces on both sides. The third lens unit Gr3 is composed solely of a sixth lens element L6. The sixth lens element L6 is a biconvex positive plastic lens element having aspherical surfaces on both sides.

In the second embodiment (FIG. 2), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side. The second lens unit Gr2 is composed of, from the object side, an aperture stop ST, a third lens element L3, a cemented lens element formed by cementing together a fourth lens element L4 and a fifth lens element L5, and a sixth lens element L6. The third lens element L3 is a biconvex positive plastic lens element having an aspherical surface on the object side. The fourth lens element L4 is a biconvex positive glass lens element. The fifth lens element L5 is a biconcave negative glass lens element. The sixth lens element L6 is a positive meniscus plastic lens element convex to the object side and having aspherical surfaces on both sides. The third lens unit Gr3 is composed solely of a seventh lens element L7. The seventh lens element L7 is a biconvex positive plastic lens element having an aspherical surface on the object side.

In the third embodiment (FIG. 3), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side. The second lens unit Gr2 is composed of, from the object side, an aperture stop ST, a third lens element L3, a fourth lens element L4, and a fifth lens element L5. The third lens element L3 is a biconvex positive plastic lens element having an aspherical surface on the object side. The fourth lens element L4 is a negative meniscus glass lens element concave to the image side. The fifth lens element L5 is a biconvex positive plastic lens element having aspherical surfaces on both sides. The third lens unit Gr3 is composed solely of a sixth lens element L6. The sixth lens element L6 is a positive meniscus plastic lens element convex to the image side and having aspherical surfaces on both sides.

In the fourth embodiment (FIG. 4), in a three-unit zoom construction composed of a negative, a positive, and a positive lens unit, each lens unit is built as follows. The first lens unit Gr1 is composed of, from the object side, a first lens element L1 and a second lens element L2. The first lens element L1 is a biconcave negative plastic lens element having aspherical surfaces on both sides. The second lens element L2 is a positive meniscus plastic lens element convex to the object side. The second lens unit Gr2 is composed of, from the object side, an aperture stop ST, a third lens element L3, a fourth lens element L4, and a fifth lens element L5. The third lens element L3 is a biconvex positive plastic lens element having an aspherical surface on the object side. The fourth lens element L4 is a biconcave negative plastic lens element. The fifth lens element L5 is a biconvex positive plastic lens element having aspherical surfaces on both sides. The third lens unit Gr3 is composed solely of a sixth lens element L6. The sixth lens element L6 is a positive meniscus plastic lens element convex to the image side and having aspherical surfaces on both sides.

As described above, in all the embodiments, the first lens unit Gr1 is composed of two plastic lens elements L1 and L2. By building the first lens unit with two plastic lens elements in a negative-led zoom lens system in this way, it is possible to realize a satisfactorily compact zoom lens system while securing high optical performance. Using the image-taking apparatuses of the embodiments in devices such as digital cameras and portable data terminals contributes to making such devices slim, lightweight, compact, inexpensive, high-performance, intelligent, and otherwise better. Now, the conditions that should preferably be fulfilled to obtain a proper balance among such benefits and to achieve higher optical performance and other advantages will be described.

In all the embodiments, for easy correction of aberrations, the first lens element L1, which is disposed at the object-side end, is given an aspherical surface. It is preferable that, in this way, the first lens element, disposed at the object-side end, be given at least one aspherical surface. This makes it possible to satisfactorily correct distortion and curvature of field. A lens element having an aspherical surface may be formed as a glass-molded lens element, a composite aspherical-surface lens element, a plastic lens element, or the like. Among these, in terms of the cost-performance ratio, using a lens element formed of plastic helps effectively achieve cost reduction. Building the first lens unit with two plastic lens elements helps obtain high aberration-correcting ability, and moreover the use of plastic lens elements alone helps achieve weight reduction, leading to a reduction in the burden on the driving system for zooming and the like.

It is preferable that the first lens unit be composed of two plastic lens elements, and moreover that the first lens element, i.e., the one disposed at the object-side end in the first lens unit, fulfill conditional formula (1) below.

$$1 < |f1/fw| < 3 \quad (1)$$

where f1 represents the focal length of the first lens element; and
fw represents the focal length of the zoom lens system as a whole at the wide-angle end.

Conditional formula (1) defines the conditional range that should preferably be fulfilled with respect to the optical power of the first lens element formed of plastic. Fulfilling conditional formula (1) makes it possible to reduce the lens diameter and shorten the total length, and simultaneously to reduce costs. If the lower limit of conditional formula (1) is disregarded, the optical power of the first lens element is so strong that it is difficult to correct aberrations. This leads, for example, to problems such as excessively large negative distortion or over-side curvature of field. By contrast, if the upper limit of conditional formula (1) is disregarded, whereas aberrations can be corrected favorably, the lens diameter or the total length is unduly great, making the zoom lens system as a whole unduly large.

It is further preferable that conditional formula (1a) below be fulfilled.

$$1 < |f1/fw| < 2 \quad (1a)$$

This conditional formula (1a) defines a further preferable conditional range within that defined by conditional formula (1) above from the above-mentioned viewpoints and out of other considerations.

Using a plastic lens element is effective in making the zoom lens system lightweight and inexpensive, and using a plastic lens element having an aspherical surface is effective further in obtaining higher optical performance. However, using a plastic lens element results in larger temperature-related variation in the back focal length, and thus makes it difficult to maintain performance in a wide temperature range. Specifically, a plastic lens element exhibits larger temperature-related variation in shape and thus larger temperature-related variation in optical performance than a glass lens element. Accordingly, as temperature varies, a plastic lens element causes variation in the back focal length and appearance of aberrations. To avoid these inconveniences, it is preferable that, as in all the embodiments, one of the two plastic lens elements constituting the first lens unit be given a positive optical power and the other a negative optical power. By building the first lens unit with one positive and one negative plastic lens element, it is possible to cancel the influence of temperature variation.

It is preferable that the two plastic lens elements constituting the first lens unit fulfill conditional formula (2) below.

$$15 < vdn - vdp \quad (2)$$

where vdp represents an Abbe number of the plastic lens element having a positive optical power; and
vdn represents an Abbe number of the plastic lens element having a negative optical power.

Conditional formula (2) defines the conditional range that should preferably be fulfilled with respect to the chromatic aberration caused by the two plastic lens elements constituting the first lens unit. When consideration is given to the balance between the optical powers of the positive and negative lens elements, one each, constituting the first lens unit, which has a negative optical power as a whole, fulfilling conditional formula (2) makes satisfactory correction of chromatic aberration possible, and disregarding the lower limit of conditional formula (2) makes correction of chromatic aberration difficult.

It is preferable that at least one surface of the plastic lens element having a negative optical power included in the first lens unit be an aspherical surface. In other words, it is preferable that the plastic lens element having a negative optical power included in the first lens unit either have an aspherical surface on one side or have aspherical surfaces on both sides. Giving this lens element at least one aspherical surface makes it possible to satisfactorily correct aberrations such as distortion and curvature of field, and makes it possible to make the zoom lens system as a whole compact.

It is preferable that the aspherical surface used in the plastic lens element having a negative optical power included in the first lens unit be so shaped that the optical power thereof decreases toward the edge. Specifically, assuming that the effective radius of the aspherical surface is represented by Y and that the height in a direction perpendicular to the optical axis is represented by y, it is preferable that, for an arbitrary height y in the range of $0.8Y \leq y \leq Y$, the aspherical surface mentioned above fulfill conditional formula (3) below.

$$-0.1 \leq \phi \cdot (N'-N) \cdot d[x(y)-x0(y)]/dy \leq 0 \quad (3)$$

where $\phi$ represents the optical power (mm$^{-1}$) of the aspherical surface;
N represents the refractive index for the d-line of the medium present on the object side of the aspherical surface;
N' represents the refractive index for the d-line of the medium present on the image side of the aspherical surface;
x(y) represents the surface shape of the aspherical surface (the displacement along the optical axis at the height y in the direction perpendicular to the optical axis of the aspherical surface, mm); and
x0(y) represents the surface shape of the reference spherical surface for the aspherical surface (the displacement along the optical axis at the height y in the direction perpendicular to the optical axis of the reference spherical surface, mm).

Here, the surface shape x(y) of the aspherical surface and the surface shape x0(y) of the reference spherical surface are given by the following formulae (as) and (re), respectively:

$$x(y) = (C0 \cdot y^2)/(1 + \sqrt{1 - \epsilon \cdot C0^2 \cdot y^2}) + \Sigma(Aj \cdot y^j) \quad (as)$$

$$x0(y) = (C0 \cdot y^2)/(1 + \sqrt{1 - C0^2 \cdot y^2}) \quad (re)$$

where

C0 represents the curvature (mm$^{-1}$) of the reference spherical surface for the aspherical surface;
$\epsilon$ represents the quadric surface parameter; and
Aj represents the aspherical surface coefficient of j-th order.

Conditional formula (3) defines the conditional range that should preferably be fulfilled with respect to the shape of the aspherical surface. When conditional formula (3) is fulfilled, the aspherical surface is so shaped that the optical power of the first lens unit decreases toward the edge. Thus, when conditional formula (3) is fulfilled, it is possible to properly correct distortion and curvature of field, in particular in the wide-angle region. If the lower limit of conditional formula (3) is disregarded, large positive distortion appears in the wide-angle region, in particular at a close-up distance, and in addition the image plane leans greatly toward the under side. By contrast, if the upper limit of conditional formula (3) is disregarded, large negative distortion appears in the wide-angle region, in particular at a close-up distance, and in addition the image plane leans greatly toward the over side. In a case where the first lens unit includes two or more aspherical surfaces, at least one of them needs to fulfill conditional formula (3); that is, any other aspherical surface does not have to fulfill conditional formula (3) in consideration of other aberrations.

It is preferable that the image-side surface of the first lens element, i.e., the lens element disposed at the object-side end of the first lens unit, be concave to the image side and fulfill conditional formula (4) below.

$$\theta \leq 48° \qquad (4)$$

where

θ represents the surface inclination angle of the image-side surface of the first lens element at the position thereon corresponding to the effective radius (where the surface inclination angle is defined as the angle formed, on a plane including an optical axis, between the line tangent to the image-side surface of the first lens element and the line perpendicular to the optical axis, assuming that the surface inclination angle is 0° at the position corresponding the optical axis).

Conditional formula (4) defines the conditional range that should preferably be fulfilled with respect to the shape of the image-side surface of the first lens element formed of plastic. The larger the surface inclination angle of the image-side surface of the first lens element is made, the easier it becomes to correct aberrations. However, this makes release from a mold difficult, and thus makes it difficult to form the plastic lens element by the use of a mold. By making the image-side surface of the first lens element concave to the image side and making the surface inclination angle at the effective radius position thereon 48° or smaller, it is possible to easily form the first lens element by the use of a mold and thereby to achieve cost reduction.

Moreover, it is preferable that at least one plastic lens element having a positive optical power be disposed in or posterior to the second lens unit. Since the first lens unit as a whole has a negative optical power, by disposing a plastic lens element having a positive optical power in or posterior to the second lens unit, it is possible to effectively reduce the influence of temperature variation such as variation in the back focal length.

It is preferable that, as in all the embodiments, at least three of the lens elements disposed in or posterior to the second lens unit be plastic lens elements. In other words, it is preferable that the zoom lens system as a whole include at least five plastic lens elements. Plastic lenses are easy to fabricate, and can be mass-fabricated. Thus, by using five or more plastic lens elements in a negative-led zoom lens system as a whole, it is possible to effectively achieve weight reduction and cost reduction in the zoom lens system. From this viewpoint, it is further preferable that, as in the fourth embodiment, all the lens elements be plastic lens element. By using plastic lens elements as all the lens elements, it is possible to make the most of the benefits mentioned above.

From the viewpoint of achieving a proper optical power balance among the plastic lens elements mentioned above, it is preferable that, for all the plastic lens elements included in the zoom lens system, conditional formula (5) below be fulfilled:

$$-3.5 < \Sigma[(ft/fi) \times hi] < 3.5 \qquad (5)$$

where fi represents the focal length (mm) of the i-th plastic lens element;

ft represents the focal length (mm) of the zoom lens system as a whole at the telephoto end; and hi represents the ray height (mm) of a paraxial peripheral ray on the object-side surface of the i-th plastic lens element, assuming that paraxial ray tracing is performed at the telephoto end under the following initial conditions: the equivalent inclination angle $\alpha 1=0$ and the height $h1=1$.

Conditional formula (5) defines the conditional range that should preferably be fulfilled with respect to the sum of the degrees in which, as temperature varies, the individual plastic lens elements influence the back focal length. Where a plurality of plastic lens elements are used, it is preferable to use positive and negative lens elements in such a way that the influence they respectively exert is cancelled. Fulfilling conditional formula (5) makes it possible to reduce temperature-related variation in the back focal length. If the lower limit of conditional formula (5) is disregarded, negatively-powered plastic lens elements cause unduly large variation in the back focal length as temperature varies. By contrast, if the upper limit of conditional formula (5) is disregarded, positively-powered plastic lens elements cause unduly large variation in the back focal length as temperature varies. Thus, in either case, it is necessary to additionally use a mechanism for correcting the back focal length according to variation in temperature.

In the embodiments described above and in the practical examples presented later, some plastic lens elements have a spherical surface. By making such a surface aspherical, it is possible to obtain higher aberration-correcting ability. For example, all the surfaces of the plastic lens elements may be made aspherical.

In all the embodiments, the zoom lens system TL is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, it is preferable to use lens elements formed out of a uniform material.

It is to be understood that the embodiments described above and the practical examples described later include the constructions described below, and with these constructions, it is possible to realize zoom lens systems that offer high optical performance despite being compact. By using them as image-taking lens systems in digital cameras, portable data devices (such as cellular phones and PDAs), and the like, it is possible to contribute to making such devices lightweight, compact, inexpensive, high-performance, intelligent, and otherwise better.

(Z1) A zoom lens system comprising a plurality of lens units and achieving zooming by varying the distances between the lens units, wherein the zoom lens system includes at least, from the object side thereof, a first lens unit having a negative optical power and a second lens unit having a positive optical power, the distance between the first and second lens units decreases during zooming from the wide-angle end to the telephoto end, and the first lens unit consists of two plastic lens elements.

(Z2) A zoom lens system as described in (Z1) above, wherein the first lens element, i.e., the lens element disposed at the object-side end of the first lens unit, fulfills conditional formula (1) or (1a) noted earlier.

(Z3) A zoom lens system as described in (Z1) or (Z2) above, wherein, of the two plastic lens elements constituting the first lens unit, one has a positive optical power and the other has a negative optical power.

(Z4) A zoom lens system as described in (Z3) above, wherein the two plastic lens elements constituting the first lens unit fulfill conditional formula (2) noted earlier.

(Z5) A zoom lens system as described in (Z3) or (Z4) above, wherein at least one surface of the plastic lens element having a negative optical power included in the first lens unit is an aspherical surface.

(Z6) A zoom lens system as described in (Z5) above, wherein, assuming that the effective radius of the aspherical surface is represented by Y and that the height in a direction perpendicular to the optical axis is represented by y, then, for an arbitrary height y in the range of $0.8Y \leq y \leq Y$, the aspherical surface fulfills conditional formula (3) noted earlier.

(Z7) A zoom lens system as described in one of (Z1) to (Z6) above, wherein the first lens element, i.e., the lens element disposed at the object-side end of the first lens unit, is concave to the image side and fulfils conditional formula (4) noted earlier.

(Z8) A zoom lens system as described in one of (Z1) to (Z7) above, wherein at least one plastic lens element having a positive optical power is disposed in or posterior to the second lens unit.

(Z9) A zoom lens system as described in one of (Z1) to (Z8) above, wherein at least three of lens elements disposed in or posterior to the second lens unit are plastic lens elements.

(Z10) A zoom lens system as described in one of (Z1) to (Z9) above, wherein all lens elements are plastic lens elements.

(Z11) A zoom lens system as described in one of (Z8) to (Z10) above, wherein, for all the plastic lens elements included in the zoom lens system, conditional formula (5) noted earlier is fulfilled.

(Z12) A zoom lens system as described in one of (Z1) to (Z11) above, wherein the second lens unit includes an aperture stop at the object-side end thereof.

(U1) An image-taking apparatus comprising a zoom lens system as described in one of (Z1) to (Z12) above and an image sensor for converting the optical image formed by the zoom lens system into an electrical signal.

(C1) A camera comprising an image-taking apparatus as described in (U1) above so as to be used for shooting at least either a still picture of a subject or a moving picture of a subject.

(C2) A camera as described in (C1) above, wherein the camera is a digital camera, video camera, or a camera incorporated in or externally fitted to a cellular phone, personal digital assistant, personal computer, mobile computer, or peripheral device therefor.

(D1) A digital device comprising an image-taking apparatus as described in (U1) above so as to be additionally capable of shooting at least either a still picture of a subject or a moving picture of a subject.

(D2) A digital device as described in (D1) above, wherein the digital device is a cellular phone, personal digital assistant, personal computer, mobile computer, or peripheral device therefor.

EXAMPLES

Hereinafter, the construction and other features of practical examples of the zoom lens system used in an image-taking apparatus embodying the present invention will be presented with reference to their construction data and other data. Examples 1 to 4 presented below are numerical examples corresponding to the first to fourth embodiments, respectively, described hereinbefore, and therefore the optical construction diagrams (FIGS. 1 to 4) of the first to fourth embodiments also show the lens construction of Examples 1 to 4, respectively.

Tables 1 to 4 show the construction data of Examples 1 to 4, respectively. Tables 5 and 6 show the values of the conditional formulae and the data related thereto as actually observed in each example. In the basic optical construction (with "i" representing the surface number) presented in each of Tables 1 to 4, ri (i=1, 2, 3, . . . ) represents the radius of curvature (in mm) of the i-th surface from the object side, di (i=1, 2, 3, . . . ) represents the axial distance (in mm) between the i-th and (i+1)-th surfaces from the object side, and Nd and vd respectively represent the refractive index for the d-line and the Abbe number of the optical material filling the axial distance di. For each of those axial distances di which vary during zooming, i.e. variable axial distances, three values are listed, namely, from left, the axial distance observed at the wide-angle end (in the shortest-focal-length state, W), the axial distance observed at the middle (in the middle-focal-length state, M), and the axial distance observed at the telephoto end (in the longest-focal-length state, T). Shown together with these data are the focal length (f, mm) and f-number (FNO) of the entire system observed in those three different focal-length states W, M, and T.

A surface of which the radius of curvature ri is marked with an asterisk (*) is an aspherical surface (a refractive optical surface having an aspherical shape, a surface that exerts a refractive effect equivalent to that of an aspherical surface, or the like). The surface shape of such an aspherical surface is defined by formula (AS) below. The aspherical surface data of the aspherical surfaces used in each example are also shown in Tables 1 to 4. It should be noted, however, that any coefficient that equals zero is omitted, and that, for any relevant data, "E−n" represents "$\times 10^{-n}$" and "E+n" represents "$\times 10^{+n}$."

$$X(H)=(C0 \cdot H^2)/(1+\sqrt{1-\epsilon \cdot C0^2 \cdot H^2})+\Sigma(Aj \cdot H^j) \quad (AS)$$

where

X(H) represents the displacement along the optical axis AX at the height H (relative to the vertex);

H represents the height in a direction perpendicular to the optical axis AX;

C0 represents the paraxial curvature (=1/ri);

ε represents the quadric surface parameter; and

Aj represents the aspherical surface coefficient of j-th order.

FIGS. 5A to 5I, FIGS. 6A to 6I, FIGS. 7A to 7I, and FIGS. 8A to 8I are aberration diagrams of Examples 1 to 4, respectively, all obtained in the state focused at infinity. Of these aberration diagrams, FIGS. 5A, 5B, 5C, 6A, 6B, 6C, 7A, 7B, 7C, 8A, 8B, and 8C show the aberrations observed at the wide-angle end W, FIGS. 5D, 5E, 5F, 6D, 6E, 6F, 7D, 7E, 7F, 8D, 8E, and 8F show the aberrations observed at the middle M, and FIGS. 5G, 5H, 5I, 6G, 6H, 6I, 7G, 7H, 7I, 8G, 8H, and 8I show the aberrations observed at the telephoto end T. Of these aberration diagrams, FIGS. 5A, 5D, 5G, 6A, 6D, 6G, 7A, 7D, 7G, 8A, 8D, and 8G show spherical aberration, FIGS. 5B, 5E, 5H, 6B, 6E, 6H, 7B, 7E, 7H, 8B, 8E, and 8H show astigmatism, and FIGS. 5C, 5F, 5I, 6C, 6F, 6I, 7C, 7F, 7I, 8C, 8F, and 8I show distortion. The symbol FNO represents the f-number, and the symbol Y' (mm) represents the maximum image height (corresponding to the distance from the optical axis AX) on the light-receiving surface SS of the image sensor SR. In the spherical aberration diagrams, the solid line (d) represents the spherical aberration (mm) observed for the d-line, and the broken line (SC) represents the deviation (mm) from the sine condition to be fulfilled. In the astigmatism diagrams, the broken line (DM) and solid line (DS) represent the astigmatism (mm) observed for the d-line on the meridional and sagittal planes, respectively. In the distortion diagrams, the solid line represents the distortion (%) observed for the d-line.

As described above, according to the present invention, in a negative-led zoom lens system, the first lens unit consists of two plastic lens elements. This makes it possible to provide an image-taking apparatus incorporating a zoom lens system that offers high optical performance despite being compact. By applying an image-taking apparatus according to the present invention in devices such as digital cameras and portable data terminals, it is possible to contribute to making such devices slim, lightweight, compact, inexpensive, high-performance, intelligent, and otherwise better.

TABLE 1

| Example 1 | | f[mm] | | 6.30(W)~10.64(M)~17.96(T) | | |
| | | FNO | | 2.88(W)~3.54(M)~4.90(T) | | |
| i | ri[mm] | di[mm] | Nd | νd | Element, etc. | |
| 1 | −40.214 | * | | | | Gr1 |
| | | 1.800 | 1.53048 | 55.72 | L1p | (−) |
| 2 | 6.703 | * | | | | |
| | | 3.500 | | | | |
| 3 | 11.180 | * | | | | |
| | | 2.400 | 1.62017 | 24.01 | L2p | |
| 4 | 23.002 | | | | | |
| | | 18.604(W)~6.886(M)~1.158(T) | | | | |
| 5 | ∞ | | | | ST | Gr2 |
| | | 1.000 | | | | (+) |
| 6 | 7.118 | | | | | |
| | | 3.500 | 1.83481 | 42.72 | L3 | |
| 7 | −12.681 | | | | | |
| | | 0.010 | 1.51400 | 42.83 | | |
| 8 | −12.681 | | | | | |
| | | 1.200 | 1.80518 | 25.46 | L4 | |
| 9 | 8.691 | | | | | |
| | | 1.200 | | | | |
| 10 | 5.234 | * | | | | |
| | | 1.800 | 1.53048 | 55.72 | L5p | |
| 11 | 6.338 | * | | | | |
| | | 4.366(W)~8.076(M)~16.370(T) | | | | |
| 12 | 19.777 | * | | | | Gr3 |
| | | 2.600 | 1.53048 | 55.72 | L6p | (+) |
| 13 | −33.303 | * | | | | |
| | | 2.775(W)~3.106(M)~1.412(T) | | | | |
| 14 | ∞ | | | | | PL |
| | | 1.000 | 1.54426 | 69.60 | | |
| 15 | ∞ | | | | | |

Aspherical Surface Data of the i-th Surface (*)

| i | ε | A4 | A6 | A8 | A10 |
|---|---|---|---|---|---|
| 1 | 1.0000 | 0.65827515E-3 | −0.19707352E-4 | 0.27504984E-6 | −0.18864547E-8 |
| 2 | 1.0000 | 0.52332489E-3 | −0.77608889E-5 | −0.65727495E-6 | |
| 3 | 1.0000 | 0.15198955E-4 | 0.47645959E-5 | −0.21092830E-6 | |
| 10 | 1.0000 | −0.40606058E-3 | −0.50542040E-4 | −0.69204997E-5 | |
| 11 | 1.0000 | 0.17675780E-2 | −0.69367389E-5 | −0.10756071E-4 | |
| 12 | 1.0000 | −0.53378966E-3 | 0.40002221E-4 | −0.15785796E-5 | |
| 13 | 1.0000 | −0.44715137E-3 | 0.60968912E-5 | 0.11947368E-5 | −0.74835983E-7 |

TABLE 2

| Example 2 | | f[mm]<br>FNO | | 6.30(W)~10.64(M)~17.96(T)<br>2.82(W)~3.59(M)~4.90(T) | | |
|---|---|---|---|---|---|---|
| i | ri[mm] | | di[mm] | Nd | νd | Element, etc. |
| 1 | −31.648 | * | | | | L1p | Gr1<br>(−) |
| | | | 1.800 | 1.53048 | 55.72 | |
| 2 | 5.645 | * | | | | | |
| | | | 3.200 | | | |
| 3 | 10.861 | | | | | | |
| | | | 2.400 | 1.62017 | 24.01 | L2p |
| 4 | 25.370 | | | | | |
| | | | 16.795(W)~7.486(M)~1.969(T) | | | |
| 5 | ∞ | | | | | ST | Gr2<br>(+) |
| | | | 0.400 | | | |
| 6 | 7.900 | * | | | | |
| | | | 3.056 | 1.53048 | 55.72 | L3p |
| 7 | −19.046 | | | | | |
| | | | 1.000 | | | |
| 8 | 127.253 | | | | | |
| | | | 1.808 | 1.83500 | 42.98 | L4 |
| 9 | −5.688 | | | | | |
| | | | 0.010 | 1.51400 | 42.83 | |
| 10 | −5.668 | | | | | |
| | | | 1.500 | 1.67270 | 32.17 | L5 |
| 11 | 6.500 | | | | | |
| | | | 1.500 | | | |
| 12 | 12.359 | * | | | | |
| | | | 1.800 | 1.53048 | 55.72 | L6p |
| 13 | 44.765 | * | | | | |
| | | | 5.246(W)~10.952(M)~20.590(T) | | | |
| 14 | 19.099 | * | | | | | Gr3<br>(+) |
| | | | 2.381 | 1.53048 | 55.72 | L7p |
| 15 | −22.808 | | | | | |
| | | | 1.960 | | | |
| 16 | ∞ | | | | | PL |
| | | | 0.500 | 1.54426 | 69.60 | |
| 17 | ∞ | | | | | |
| | | | 1.000 | | | |
| 18 | ∞ | | | | | |
| | | | 0.500 | 1.51680 | 64.20 | |
| 19 | ∞ | | | | | |

| Asphercial Surface Data of the i-th Surface (*) | | | | |
|---|---|---|---|---|
| i | ε | A4 | A6 | A8 | A10 |
| 1 | 1.0000 | 0.22141403E−3 | −0.98315512E−6 | −0.12665146E−6 | 0.21892832E−8 |
| 2 | 1.0000 | −0.41319057E−3 | 0.35767279E−5 | −0.10285107E−5 | |
| 6 | 1.0000 | −0.48507047E−3 | −0.36847986E−5 | −0.38677473E−6 | 0.53001741E−8 |
| 12 | 1.0000 | −0.12302973E−2 | −0.34096106E−4 | −0.23506071E−5 | |
| 13 | 1.0000 | −0.90392410E−3 | −0.29013757E−4 | −0.88562562E−6 | |
| 14 | 1.0000 | −0.20228644E−3 | 0.21015759E−5 | −0.48545406E−7 | |

TABLE 3

| Example 3 | | f[mm]<br>FNO | | 6.30(W)~10.64(M)~17.96(T)<br>2.82(W)~3.69(M)~4.90(T) | | |
|---|---|---|---|---|---|---|
| i | ri[mm] | | di[mm] | Nd | νd | Element, etc. |
| 1 | −25.000 | * | | | | | Gr1<br>(−) |
| | | | 1.800 | 1.53048 | 55.72 | L1p |
| 2 | 5.560 | * | | | | |
| | | | 3.200 | | | |
| 3 | 10.435 | | | | | |
| | | | 2.400 | 1.62017 | 24.01 | L2p |
| 4 | 24.828 | | | | | |
| | | | 16.487(W)~8.175(M)~1.980(T) | | | |
| 5 | ∞ | | | | | ST | Gr2<br>(+) |
| | | | 0.400 | | | |
| 6 | 7.900 | * | | | | |
| | | | 3.021 | 1.53048 | 55.72 | L3p |
| 7 | −18.816 | | | | | |
| | | | 1.105 | | | |

TABLE 3-continued

| i | ri[mm] | | di[mm] | Nd | νd | Element, etc. | |
|---|---|---|---|---|---|---|---|
| 8 | 24.905 | | | | | | |
| | | | 1.747 | 1.84666 | 23.78 | L4 | |
| 9 | 6.500 | | | | | | |
| | | | 1.086 | | | | |
| 10 | 27.546 | * | | | | | |
| | | | 1.536 | 1.53048 | 55.72 | L5p | |
| 11 | −11.298 | * | | | | | |
| | | | 1.113(W)~10.432(M)~19.676(T) | | | | |
| 12 | −18.638 | * | | | | | Gr3 |
| | | | 2.600 | 1.53048 | 55.72 | L6p | (+) |
| 13 | −10.500 | * | | | | | |
| | | | 8.773(W)~5.406(M)~4.491(T) | | | | |
| 14 | ∞ | | | | | PL | |
| | | | 0.500 | 1.54426 | 69.60 | | |
| 15 | ∞ | | | | | | |
| | | | 1.000 | | | | |
| 16 | ∞ | | | | | | |
| | | | 0.500 | 1.51680 | 64.20 | | |
| 17 | ∞ | | | | | | |

Aspherical Surface Data of the i-th Surface (*)

| i | ε | A4 | A6 | A8 | A10 |
|---|---|---|---|---|---|
| 1 | 1.0000 | 0.55687902E−3 | −0.12374547E−4 | 0.12988854E−6 | −0.10555620E−9 |
| 2 | 1.0000 | 0.13716209E−4 | −0.91950299E−5 | −0.80543371E−6 | |
| 6 | 1.0000 | −0.49267353E−3 | −0.26116803E−5 | −0.40517655E−6 | 0.15058552E−7 |
| 10 | 1.0000 | 0.67619292E−4 | 0.19818573E−4 | 0.21955253E−5 | |
| 11 | 1.0000 | −0.22249106E−3 | 0.11659038E−5 | 0.17282750E−5 | |
| 12 | 1.0000 | −0.58296207E−3 | −0.56813869E−5 | 0.80719309E−6 | |
| 13 | 1.0000 | −0.32961992E−3 | −0.47605930E−5 | 0.53506872E−6 | 0.82654839E−9 |

TABLE 4

| Example 4 | | f[mm] | | 6.30(W)~10.64(M)~17.96(T) | | | |
|---|---|---|---|---|---|---|---|
| | | FNO | | 2.77(W)~3.71(M)~4.90(T) | | | |
| i | ri[mm] | | di[mm] | Nd | νd | Element, etc. | |
| 1 | −25.000 | * | | | | | Gr1 |
| | | | 1.800 | 1.53048 | 55.72 | L1p | (−) |
| 2 | 5.631 | * | | | | | |
| | | | 3.200 | | | | |
| 3 | 10.476 | | | | | | |
| | | | 2.400 | 1.62017 | 24.01 | L2p | |
| 4 | 25.427 | | | | | | |
| | | | 16.151(W)~8.449(M)~1.974(T) | | | | |
| 5 | ∞ | | | | | ST | Gr2 |
| | | | 0.400 | | | | (+) |
| 6 | 7.900 | * | | | | | |
| | | | 3.500 | 1.53048 | 55.72 | L3p | |
| 7 | −15.453 | | | | | | |
| | | | 0.981 | | | | |
| 8 | −150.324 | | | | | | |
| | | | 1.275 | 1.62017 | 24.01 | L4p | |
| 9 | 7.278 | | | | | | |
| | | | 1.055 | | | | |
| 10 | 36.370 | * | | | | | |
| | | | 1.453 | 1.53048 | 55.72 | L5p | |
| 11 | −12.270 | * | | | | | |
| | | | 1.162(W)~11.714(M)~20.715(T) | | | | |
| 12 | −19.803 | * | | | | | Gr3 |
| | | | 2.600 | 1.53048 | 55.72 | L6p | (+) |
| 13 | −10.500 | * | | | | | |
| | | | 8.836(W)~4.414(M)~3.473(T) | | | | |
| 14 | ∞ | | | | | PL | |
| | | | 0.500 | 1.54426 | 69.60 | | |
| 15 | ∞ | | | | | | |
| | | | 1.000 | | | | |
| 16 | ∞ | | | | | | |
| | | | 0.500 | 1.51680 | 64.20 | | |
| 17 | ∞ | | | | | | |

TABLE 4-continued

Aspherical Surface Data of the i-th Surface (*)

| i | ε | A4 | A6 | A8 | A10 |
|---|---|---|---|---|---|
| 1 | 1.0000 | 0.56843192E−3 | −0.13048405E−4 | 0.16287690E−6 | −0.54585140E−9 |
| 2 | 1.0000 | 0.62684530E−4 | −0.10369037E−4 | −0.65389889E−6 | |
| 6 | 1.0000 | −0.44881137E−3 | −0.38180637E−5 | −0.39267352E−6 | 0.15576222E−7 |
| 10 | 1.0000 | −0.14868000E−4 | 0.25755382E−4 | 0.30151679E−5 | |
| 11 | 1.0000 | −0.66014131E−4 | 0.88971029E−5 | 0.30528981E−5 | |
| 12 | 1.0000 | −0.63415399E−3 | −0.10673603E−4 | 0.87414357E−6 | |
| 13 | 1.0000 | −0.38037830E−3 | −0.92205726E−5 | 0.70526678E−6 | −0.23456065E−8 |

TABLE 5

| | Conditional Formula (1), (1a) |f11/fw| | Conditional Formula (2) νdn − νdp | Conditional Formula (4) θ (°) | Effective Radius (mm) | Conditional Formula (5) Σ { (ft/fi) × hi} |
|---|---|---|---|---|---|
| Example | | | | | |
| 1 | 1.696667 | 31.71 | 37.6 | 5.4 | −0.11836 |
| 2 | 1.409841 | 31.71 | 44.5 | 4.75 | 2.455463 |
| 3 | 1.333651 | 31.71 | 46.1 | 4.5 | 3.288902 |
| 4 | 1.347619 | 31.71 | 46.2 | 4.5 | 0.920933 |

TABLE 6

Object-Side Surface of First Lens Element (First Surface)

Conditional Formula (3):
φ · (N' − N) · d{x(y) − x0(y)}/dy

| Example | y = 0.8Y | y = 0.9Y | y = 1.0Y | Y(mm) |
|---|---|---|---|---|
| 1 | −0.0007 | −0.0005 | −0.0001 | 6.7 |
| 2 | −0.0005 | −0.0006 | −0.0007 | 6 |
| 3 | −0.0014 | −0.0017 | −0.0023 | 6.2 |
| 4 | −0.0014 | −0.0018 | −0.0024 | 6.2 |

Image-Side Surface of First Lens Element (Second Surface)

Conditional Formula (3):
φ · (N' − N) · d{x(y) − x0(y)}/dy

| Example | y = 0.8Y | y = 0.9Y | y = 1.0Y | Y(mm) |
|---|---|---|---|---|
| 1 | −0.0021 | −0.0093 | −0.0247 | 5.4 |
| 2 | −0.0084 | −0.0156 | −0.0286 | 4.75 |
| 3 | −0.0041 | −0.0087 | −0.0171 | 4.5 |
| 4 | −0.0033 | −0.0072 | −0.0143 | 4.5 |

What is claimed is:

1. A zoom lens system for forming an optical image of a subject on an image-sensing surface of an image sensor,
   wherein the zoom lens system includes at least, from an object side thereof, a first lens unit having a negative optical power, a second lens unit having a positive optical power, and a third lens unit having a positive optical power,
   wherein the zoom lens system achieves zooming by varying distances between the individual lens units in such a way that, during zooming from a wide-angle end to a telephoto end, a distance between the first and second lens units decreases, and
   wherein the first lens unit consists of two plastic lens elements.

2. A zoom lens system as claimed in claim 1,
   wherein a first lens element, i.e., a lens element disposed at an object-side end of the first lens unit, fulfills the following conditional formula (1):

$$1 < |f1/fw| < 3 \qquad (1)$$

where
   f1 represents a focal length of the first lens element; and
   fw represents a focal length of the zoom lens system as a whole at a wide-angle end.

3. A zoom lens system as claimed in claim 1,
   wherein, of the two plastic lens elements constituting the first lens unit, one has a positive optical power and another has a negative optical power.

4. A zoom lens system as claimed in claim 3,
   wherein the two plastic lens elements constituting the first lens unit fulfill the following conditional formula (2):

$$15 < \nu dn - \nu dp \qquad (2)$$

where
   νdp represents an Abbe number of the plastic lens element having a positive optical power; and
   νdn represents an Abbe number of the plastic lens element having a negative optical power.

5. A zoom lens system as claimed in claim 3,
   wherein at least one surface of the plastic lens element having a negative optical power included in the first lens unit is an aspherical surface.

6. A zoom lens system as claimed in claim 5,
   wherein, assuming that an effective radius of the aspherical surface is represented by Y and that a height in a direction perpendicular to an optical axis is represented by y, then, for an arbitrary height y in a range of 0.8Y ≦ y ≦ Y, the aspherical surface fulfills the following conditional formula (3):

$$-0.1 \leq \phi \cdot (N'-N) \cdot d[x(y)-x0(y)]/dy \leq 0 \qquad (3)$$

where
   φ represents an optical power (mm$^{-1}$) of the aspherical surface;
   N represents a refractive index for a d-line of a medium present on an object side of the aspherical surface;
   N' represents a refractive index for a d-line of a medium present on an image side of the aspherical surface;
   x(y) represents a surface shape of the aspherical surface (a displacement along the optical axis at the height y in the direction perpendicular to the optical axis of the aspherical surface, mm); and x0(y) represents a surface shape of a reference spherical surface for the aspherical surface (a displacement along the optical axis at the height y in the direction perpendicular to the optical axis of the reference spherical surface, mm).

7. A zoom lens system as claimed in claim 1,
wherein a first lens element, i.e., a lens element disposed at an object-side end of the first lens unit, is concave to an image side and fulfils the following conditional formula (4):

$$\theta \leq 48° \tag{4}$$

where
$\theta$ represents a surface inclination angle of the image-side surface of the first lens element at a position thereon corresponding to an effective radius (where the surface inclination angle is defined as an angle formed, on a plane including an optical axis, between a line tangent to the image-side surface of the first lens element and a line perpendicular to the optical axis, assuming that the surface inclination angle is 0° at a position corresponding the optical axis).

8. A zoom lens system as claimed in claim 1,
wherein at least one plastic lens element having a positive optical power is disposed in or posterior to the second lens unit.

9. A zoom lens system as claimed in claim 1,
wherein at least three of the lens elements disposed in or posterior to the second lens unit are plastic lens elements.

10. A zoom lens system as claimed in claim 1,
wherein all lens elements are plastic lens elements.

11. A zoom lens system as claimed in claim 8,
wherein, for all plastic lens elements included in the zoom lens system, the following conditional formula (5) is fulfilled:

$$-3.5 < \Sigma[(ft/fi) \times hi] < 3.5 \tag{5}$$

where
fi represents a focal length (mm) of an i-th plastic lens element;
ft represents a focal length (mm) of the zoom lens system as a whole at the telephoto end; and
hi represents a ray height (mm) of a paraxial peripheral ray on an object-side surface of the i-th plastic lens element, assuming that paraxial ray tracing is performed at the telephoto end under the following initial conditions: an equivalent inclination angle $\alpha 1=0$ and a height $h1=1$.

12. An image-taking apparatus comprising a zoom lens system that is composed of a plurality of lens units and that achieves zooming by varying distances between the lens units and an image sensor that converts an optical image formed by the zoom lens system into an electrical signal,
wherein the zoom lens system includes at least, from an object side thereof, a first lens unit having a negative optical power, a second lens unit having a positive optical power, and a third lens unit having a positive optical power,
wherein, during zooming from a wide-angle end to a telephoto end, a distance between the first and second lens units decreases, and
wherein the first lens unit consists of two plastic lens elements.

13. An image-taking apparatus as claimed in claim 12,
wherein a first lens element, i.e., a lens element disposed at an object-side end of the first lens unit, fulfills the following conditional formula (1):

$$1 < |f1/fw| < 3 \tag{1}$$

where
fl1 represents a focal length of the first lens element; and
fw represents a focal length of the zoom lens system as a whole at a wide-angle end.

14. An image-taking apparatus as claimed in claim 12,
wherein, of the two plastic lens elements constituting the first lens unit, one has a positive optical power and another has a negative optical power.

15. An image-taking apparatus as claimed in claim 12,
wherein a first lens element, i.e., a lens element disposed at an object-side end of the first lens unit, is concave to an image side and fulfils the following conditional formula (4):

$$\theta \leq 48° \tag{4}$$

where
$\theta$ represents a surface inclination angle of the image-side surface of the first lens element at a position thereon corresponding to an effective radius (where the surface inclination angle is defined as an angle formed, on a plane including an optical axis, between a line tangent to the image-side surface of the first lens element and a line perpendicular to the optical axis, assuming that the surface inclination angle is 0° at a position corresponding to the optical axis).

16. An image-taking apparatus as claimed in claim 12,
wherein all lens elements are plastic lens elements.

17. A camera comprising an image-taking apparatus that takes in an image of a subject optically and that then outputs the optical image in a form of an electrical signal,
wherein the image-taking apparatus comprises a zoom lens system that is composed of a plurality of lens units and that achieves zooming by varying distances between the lens units and an image sensor that converts an optical image formed by the zoom lens system into an electrical signal,
wherein the zoom lens system includes at least, from an object side thereof, a first lens unit having a negative optical power a second lens unit having a positive optical power, and a third lens unit having a positive optical power,
wherein, during zooming from a wide-angle end to a telephoto end, a distance between the first and second lens units decreases, and
wherein the first lens unit consists of two plastic lens elements.

18. A camera as claimed in claim 17,
wherein a first lens element, i.e., a lens element disposed at an object-side end of the first lens unit, fulfills the following conditional formula (1):

$$1 < |f1/fw| 3 \tag{1}$$

where
fl 1 represents a focal length of the first lens element; and fw represents a focal length of the zoom lens system as a whole at a wide-angle end.

19. A camera as claimed in claim 17,
wherein a first lens element, i.e., a lens element disposed at an object-side end of the first lens unit, is concave to an image side and fulfils the following conditional formula (4):

$$\theta \leq 48°  \qquad (4)$$

where

θ represents a surface inclination angle of the image-side surface of the first lens element at a position thereon corresponding to an effective radius (where the surface inclination angle is defined as an angle formed, on a plane including an optical axis, between a line tangent to the image-side surface of the first lens element and a line perpendicular to the optical axis, assuming that the surface inclination angle is 0° at a position corresponding to the optical axis).

20. A camera as claimed in claim 17, wherein all lens elements are plastic lens elements.

* * * * *

UNITED STATES PATENT AND TRADEMARK OFFICE
CERTIFICATE OF CORRECTION

PATENT NO. : 7,139,129 B2
APPLICATION NO. : 10/876362
DATED : November 21, 2006
INVENTOR(S) : Hiromichi Nose et al.

It is certified that error appears in the above-identified patent and that said Letters Patent is hereby corrected as shown below:

Column 15
Table 2, Item No. 9, delete "-5.688", insert -- -5.668--.

Column 22
Line 51, delete "power", insert -- power, --.

Signed and Sealed this

Thirtieth Day of January, 2007

JON W. DUDAS
*Director of the United States Patent and Trademark Office*